(12) United States Patent
Ginder

(10) Patent No.: US 8,894,752 B2
(45) Date of Patent: Nov. 25, 2014

(54) AIR DRYER

(71) Applicant: Graham-White Manufacturing Company, Salem, VA (US)

(72) Inventor: William F. Ginder, Salem, VA (US)

(73) Assignee: Graham-White Manufacturing Company, Salem, VA (US)

( * ) Notice: Subject to any disclaimer, the term of this patent is extended or adjusted under 35 U.S.C. 154(b) by 87 days.

(21) Appl. No.: 13/778,973

(22) Filed: Feb. 27, 2013

(65) Prior Publication Data

US 2014/0237962 A1    Aug. 28, 2014

(51) Int. Cl.
   *B01D 53/26*    (2006.01)

(52) U.S. Cl.
   CPC . *B01D 53/26* (2013.01); *Y10S 55/17* (2013.01)
   USPC ........................................ 96/116; 55/DIG. 17

(58) Field of Classification Search
   USPC ............ 96/116, 121; 55/DIG. 17; 34/80, 472, 34/473
   See application file for complete search history.

(56) References Cited

U.S. PATENT DOCUMENTS

| | | | |
|---|---|---|---|
| 3,775,946 A * | 12/1973 | Brazzel | 95/21 |
| 4,052,178 A | 10/1977 | Frantz | |
| 4,525,183 A * | 6/1985 | Cordes et al. | 96/113 |
| 4,546,442 A * | 10/1985 | Tinker | 96/114 |
| 4,806,134 A * | 2/1989 | Lhota | 96/114 |
| 5,027,529 A | 7/1991 | Cramer et al. | |
| 5,145,495 A | 9/1992 | Elamin | |
| 5,209,764 A | 5/1993 | Eberling | |
| 5,755,854 A * | 5/1998 | Nanaji | 95/11 |
| 6,581,297 B1 | 6/2003 | Ginder | |
| 6,719,825 B2 | 4/2004 | Wedge et al. | |
| 8,740,316 B2 * | 6/2014 | Schal | 303/3 |
| 2011/0052419 A1 | 3/2011 | Bordacs et al. | |
| 2012/0012005 A1 | 1/2012 | Burke | |

FOREIGN PATENT DOCUMENTS

| | | |
|---|---|---|
| JP | 2010-017618 A | 1/2010 |
| KR | 10-2006-0075882 A | 2/2008 |
| KR | 10-2006-0116750 A | 3/2008 |

OTHER PUBLICATIONS

International Search Report for International Application No. PCT/US2013/067166 dated Jan. 6, 2014.

* cited by examiner

*Primary Examiner* — Frank Lawrence
(74) *Attorney, Agent, or Firm* — Dority & Manning, P.A.

(57) ABSTRACT

An air dryer includes first and second flow paths. Each flow path includes a check valve that prevents fluid flow into the flow path and an exhaust valve having an open position that permits fluid flow out of the flow path and a shut position that prevents fluid flow out of the flow path. A diverter valve has a first position that provides fluid communication to the first flow path and a second position that provides fluid communication to the second flow path. An interlock operably connected to the diverter valve and the exhaust valves prevents positioning the diverter valve to the first position when the exhaust valve in the first flow path is in the open position and prevents positioning the diverter valve to the second position when the exhaust valve in the second flow path is in the open position.

20 Claims, 7 Drawing Sheets

AIR DRYER

FIELD OF THE INVENTION

The present invention generally involves an air dryer, such as may be incorporated into a compressed air system to remove moisture and other contaminants from compressed air.

BACKGROUND OF THE INVENTION

Compressed air is commonly used to perform a myriad of functions. For example, compressed air may be used to displace water in submarine ballast tanks to increase the buoyancy of the submarine, to operate brakes on locomotives and trucks, or to pneumatically operate valves. In each case, the compressed air may include moisture and other particulate contaminates which, if not removed, may accelerate fouling, corrosion, and other interference with the equipment.

Various air dryers are known in the art to remove moisture and particulate contaminates from the compressed air. The air dryers typically include various combinations of filters and moisture separators to clean and dry the compressed air before it reaches the equipment. For equipment that requires a continuous supply of compressed air, the air dryers may include duplicate flow paths arranged in parallel so that one flow path may purify the compressed air while the other flow path is purged of the filtered moisture and particulates. However, previous air dryer designs may be susceptible to reduced effectiveness and/or complete failure in the event of improper valve alignment. Therefore, an improved air dryer that may continue to operate and supply compressed air in spite of a failed or misaligned valve would be useful.

BRIEF DESCRIPTION OF THE INVENTION

Aspects and advantages of the invention are set forth below in the following description, or may be obvious from the description, or may be learned through practice of the invention.

One embodiment of the present invention is an air dryer having a first and second flow paths through the air dryer. The first flow path includes a first check valve that prevents fluid flow into the first flow path and a first exhaust valve having an open position that permits fluid flow out of the first flow path and a shut position that prevents fluid flow out of the first flow path. The second flow path is in parallel with the first flow path and includes a second check valve that prevents fluid flow into the second flow path and a second exhaust valve having an open position that permits fluid flow out of the second flow path and a shut position that prevents fluid flow out of the second flow path. A first control air valve provides fluid communication from upstream of the second check valve to the first exhaust valve, and a second control air valve provides fluid communication from upstream of the first check valve to the second exhaust valve.

Another embodiment of the present invention is an air dryer that includes a first flow path through the air dryer. The first flow path includes a first check valve that prevents fluid flow into the first flow path and a first exhaust valve having an open position that permits fluid flow out of the first flow path and a shut position that prevents fluid flow out of the first flow path. A second flow path in parallel with the first flow path includes a second check valve that prevents fluid flow into the second flow path and a second exhaust valve having an open position that permits fluid flow out of the second flow path and a shut position that prevents fluid flow out of the second flow path. A diverter valve has a first position that provides fluid communication to the first flow path and a second position that provides fluid communication to the second flow path. A first control air valve provides fluid communication from upstream of the second check valve to the diverter valve, and a second control air valve provides fluid communication from upstream of the first check valve to the diverter valve.

In yet another embodiment of the present invention, an air dryer includes a first flow path through the air dryer, and the first flow path includes a first check valve that prevents fluid flow into the first flow path and a first exhaust valve having an open position that permits fluid flow out of the first flow path and a shut position that prevents fluid flow out of the first flow path. A second flow path in parallel with the first flow path includes a second check valve that prevents fluid flow into the second flow path and a second exhaust valve having an open position that permits fluid flow out of the second flow path and a shut position that prevents fluid flow out of the second flow path. A diverter valve has a first position that provides fluid communication to the first flow path and a second position that provides fluid communication to the second flow path. An interlock operably connected to the diverter valve and the first and second exhaust valves prevents positioning the diverter valve to the first position when the first exhaust valve is in the open position and prevents positioning the diverter valve to the second position when the second exhaust valve is in the open position.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
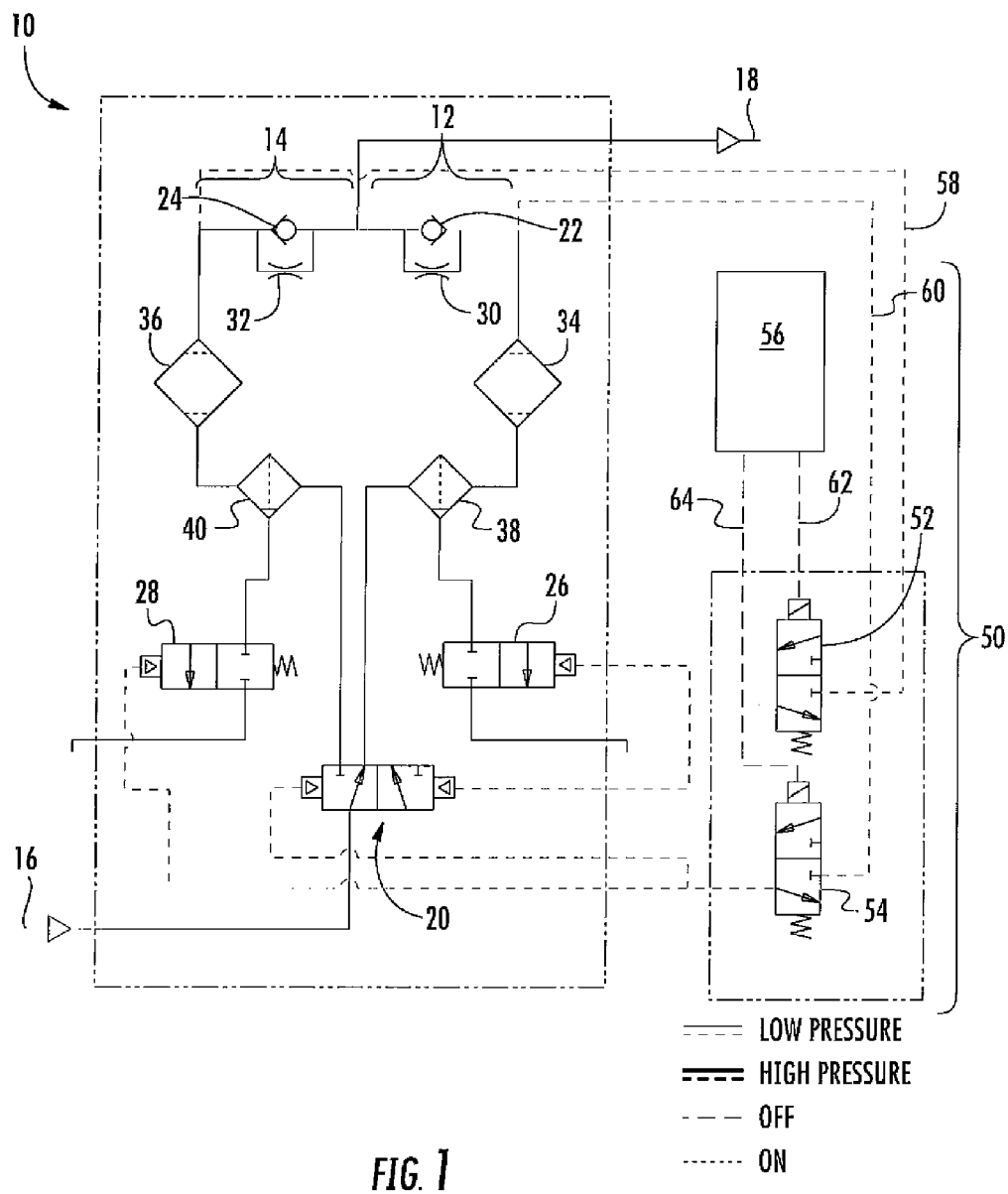
FIG. 1 is a schematic diagram of an air dryer according to an embodiment of the present invention without pressure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream," "downstream," "radially," and "axially" refer to the relative direction with respect to fluid flow in a fluid pathway. For example, "upstream" refers to the direction from which the fluid normally flows, and "downstream" refers to the direction to which the fluid normally flows. Similarly, "radially" refers to the relative direction substantially perpendicular to the fluid flow, and "axially" refers to the relative direction substantially parallel to the fluid flow.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include an air dryer that may be incorporated into a compressed air system to remove moisture and other contaminants from compressed air. The air dryer generally includes multiple flow paths arranged in parallel, and each flow path includes an exhaust valve. Each flow path may also include various means for removing moisture and/or particulate contaminates. The means for removing moisture and/or particulates may include various combinations of filters and/or moisture separators to clean and dry the compressed air. The air dryer may also include a diverter valve having a first position that provides fluid communication to one flow path and a second position that provides fluid communication to the other flow path. An interlock may be operably connected to the diverter valve and the exhaust valves to prevent positioning the diverter valve to either flow path when the associated exhaust valve is in the open position.

FIG. 1 provides a schematic diagram of an air dryer 10 according to an embodiment of the present invention without pressure, and FIGS. 2-7 provide a schematic diagram of the air dryer shown in FIG. 1 during various modes of operation. As shown, the air dryer 10 generally includes first and second flow paths 12, 14, although additional flow paths may be included and are within the scope of the present invention. The first and second flow paths 12, 14 are arranged in parallel between an inlet 16 and an outlet 18, and a diverter valve 20 has a first position (shown in FIGS. 1-3) that provides fluid communication to the first flow path 12 and a second position (shown in FIGS. 4-7) that provides fluid communication to the second flow path 14. In the particular embodiment shown in FIGS. 1-7, the diverter valve 20 is located at the inlet 16; however, in alternate embodiments, the diverter valve may be located at the outlet 18. In this manner, the diverter valve 20 aligns one flow path with the inlet 16 and outlet 18 while the other flow path is being purged of filtered fluid.

Each flow path 12, 14 includes a check valve 22, 24 proximate to the outlet 18 that prevents fluid flow into the flow path and an exhaust valve 26, 28 having an open position that permits fluid flow out of the flow path and a shut position that prevents fluid flow out of the flow path. Each exhaust valve 26, 28 may be biased on the shut position. A bypass orifice 30, 32 in each flow path 12, 14 provides fluid communication around the respective check valves 22, 24 in either direction. In addition, each flow path 12, 14 includes various means for removing moisture and/or particulate from the flow path. The structure for removing moisture and/or particulate may include various combinations of filters and/or moisture separators to clean and dry the compressed air. In the exemplary embodiment shown in FIG. 1, the structure for removing moisture from the compressed air is a desiccant filter 34, 36 in each flow path 12, 14. In addition, each flow path 12, 14 includes a coalescing filter 38, 40 that removes particulate contamination and/or collects moisture from the desiccant filters 34, 36.

An interlock 50 is operably connected to the diverter valve 20 and the exhaust valves 26, 28 in each flow path 12, 14. The interlock 50 prevents positioning the diverter valve 20 to the first position (shown in FIGS. 1-3) when the first exhaust valve 26 is in the open position and prevents positioning the diverter valve 20 to the second position (shown in FIGS. 4-7) when the second exhaust valve is in the open position. The interlock 50 may include various combinations of manual or remotely operated control valves that enable operation of the diverter valve 20 and exhaust valves 26, 28 based on pressure sensed in the flow paths 12, 14. In the embodiment shown in FIG. 1, for example, the interlock 50 includes first and second control air valves 52, 54 and a controller 56. The control air valves 52, 54 may be solenoid operated valves biased in the shut position. A first sensing line 58 connects the first control air valve 52 to the second flow path 14 upstream from the second check valve 24. When open, the first control air valve 52 provides fluid communication from upstream of the second check valve 24 to the diverter valve 20 and the first exhaust valve 26. Similarly, a second sensing line 60 connects the second control air valve 54 to the first flow path 12 upstream from the first check valve 22. When open, the second control air valve 54 enables fluid communication from upstream of the first check valve 22 to the diverter valve 20 and the second exhaust valve 28. At predetermined intervals, the controller 56 may to send a signal 62, 64 to each control air valve 52, 54 to actuate the solenoid and open the control air valve 52, 54. In this manner, air pressure from the opposite side flow path provides pilot air pressure through the control air valves 52, 54 to reposition the diverter valve 20 and open the respective exhaust valves 26, 28. The operation of the control air valves 52, 54 and controller 56 will be described more fully with respect to FIGS. 2-7.

Normal operation of the air dryer 10 will now be described with respect to FIGS. 2-5. During normal operation, the air dryer 10 cycles between using one flow path to dry and clean the compressed air while the other flow path purges moisture and otherwise regenerates. For example, the controller 56 may be programmed to rotate cycles at pre-determined intervals. During the first portion of each cycle, the controller 56 may be programmed to purge the idle flow path of moisture before allowing the idle flow path to increase pressure before being switched to becoming the active flow path.

Figure 2:
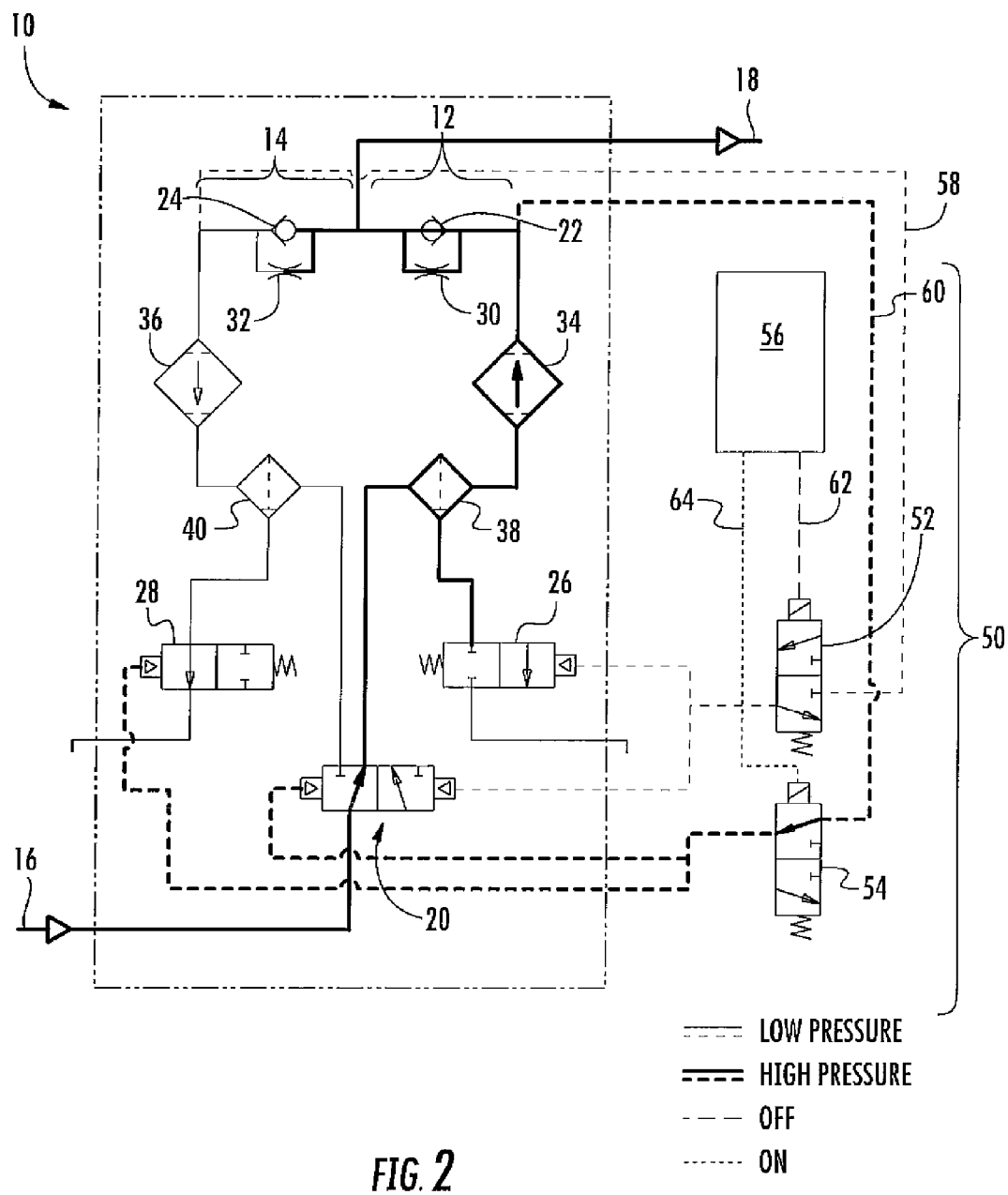
FIG. 2 is a schematic diagram of the air dryer shown in FIG. 1 during normal operation with the right flow path drying compressed air and the left flow path purging.

FIG. 2 shows the air dryer 10 at the beginning of a first flow path 12 drying cycle when the first flow path 12 is drying the air and the second flow path 14 is purging moisture through the second exhaust valve 28. As shown in FIG. 2, the diverter valve 20 is in the first position so that the compressed air may flow from the inlet 16, through the diverter valve 20, and into the first flow path 12. The first signal 62 is off during the entire first flow path 12 drying cycle, so the first control air valve 52 is shut, and the first exhaust valve 26 is shut. As a result, the compressed air flows through the first coalescing filter 38 and first desiccant chamber 34 to remove moisture and particulate from the compressed air. The removed moisture collects in the first coalescing filter 38. The cleaned and dried compressed air then flows through the first check valve 22 and first bypass orifice 30 and exits the air dryer 10 through the outlet 18.

The second sensing line 60 communicates pressure from upstream of the first check valve 22 to the second control air valve 54. At the beginning of the first flow path 12 drying cycle, the second signal 64 is on to actuate the solenoid on the second control air valve 54. As a result, the second control air valve 54 opens to provide control air from upstream of the first check valve 22 to the diverter valve 20 and the second exhaust valve 28. The control air maintains the diverter valve 20 in the first position and opens the second exhaust valve 28. The second check valve 24 prevents the cleaned and dried compressed air from entering the second flow path 14. However, the second bypass orifice 32 allows a portion of the cleaned and dried air to flow backwards through the second desiccant chamber 36 and second coalescing filter 40 to purge moisture from the second coalescing filter 40 through the open second exhaust valve 28.

Figure 3:
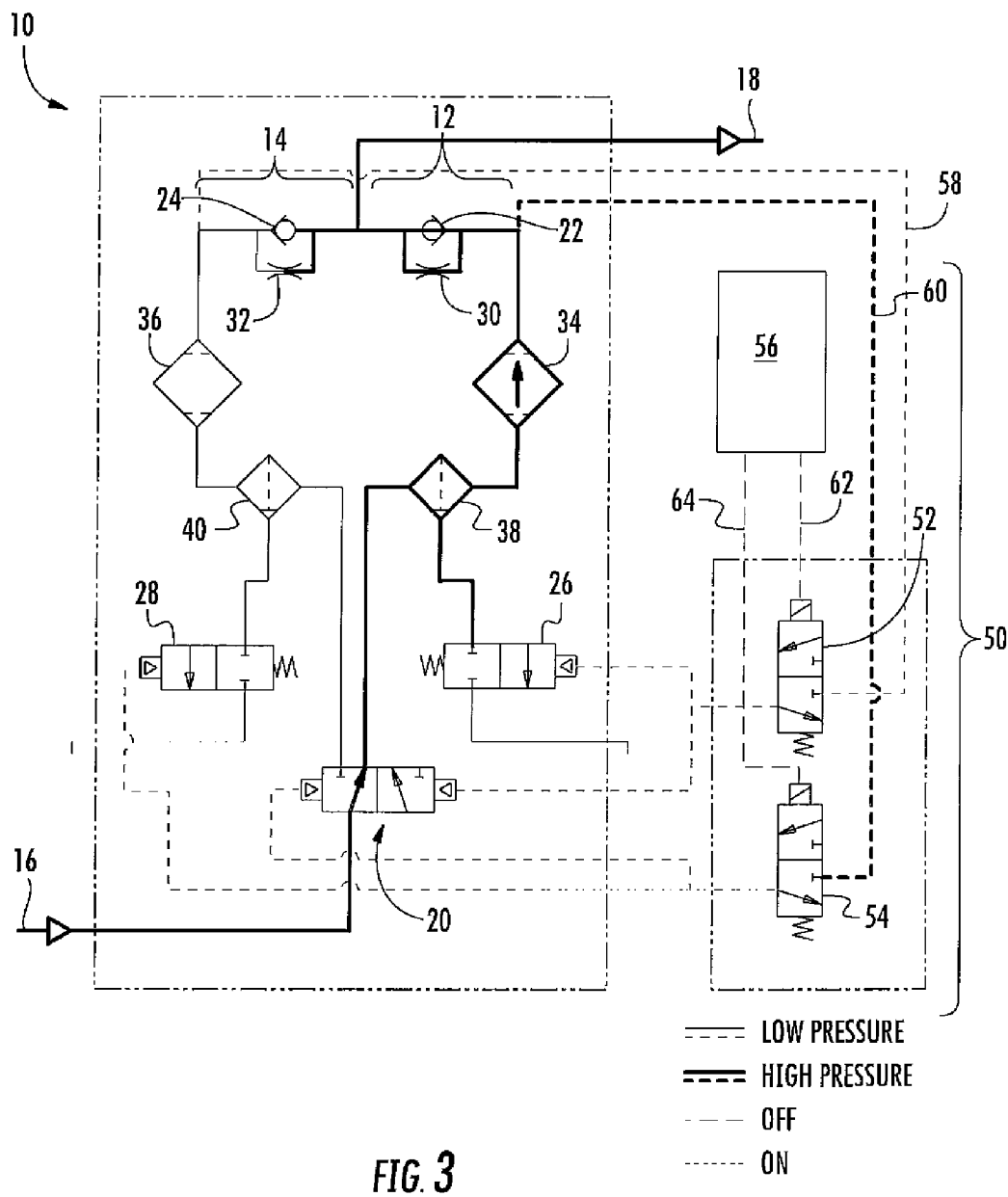
FIG. 3 is a schematic diagram of the air dryer shown in FIG. 1 during normal operation with the right flow path drying compressed air and the left flow path pressurizing.

FIG. 3 shows the first flow path 12 drying cycle after the controller 56 turns the second signal 64 off to allow the second flow path 14 to pressurize. When the second signal 64 is off, the second control air valve 54 shuts, removing control air pressure from the diverter valve 20 and the second exhaust valve 28. Without control air pressure, the diverter valve 20 remains in the first position, and the second exhaust valve 28 shuts. With the second exhaust valve 28 shut, the cleaned and dried compressed air flowing through the second bypass orifice 32 increases pressure in the second flow path 14 and in the first sensing line 58 that provides fluid communication to the first control air valve 52. The air dryer 10 is now ready to switch to a second flow path 14 drying cycle, as shown in FIG. 4.

Figure 4:
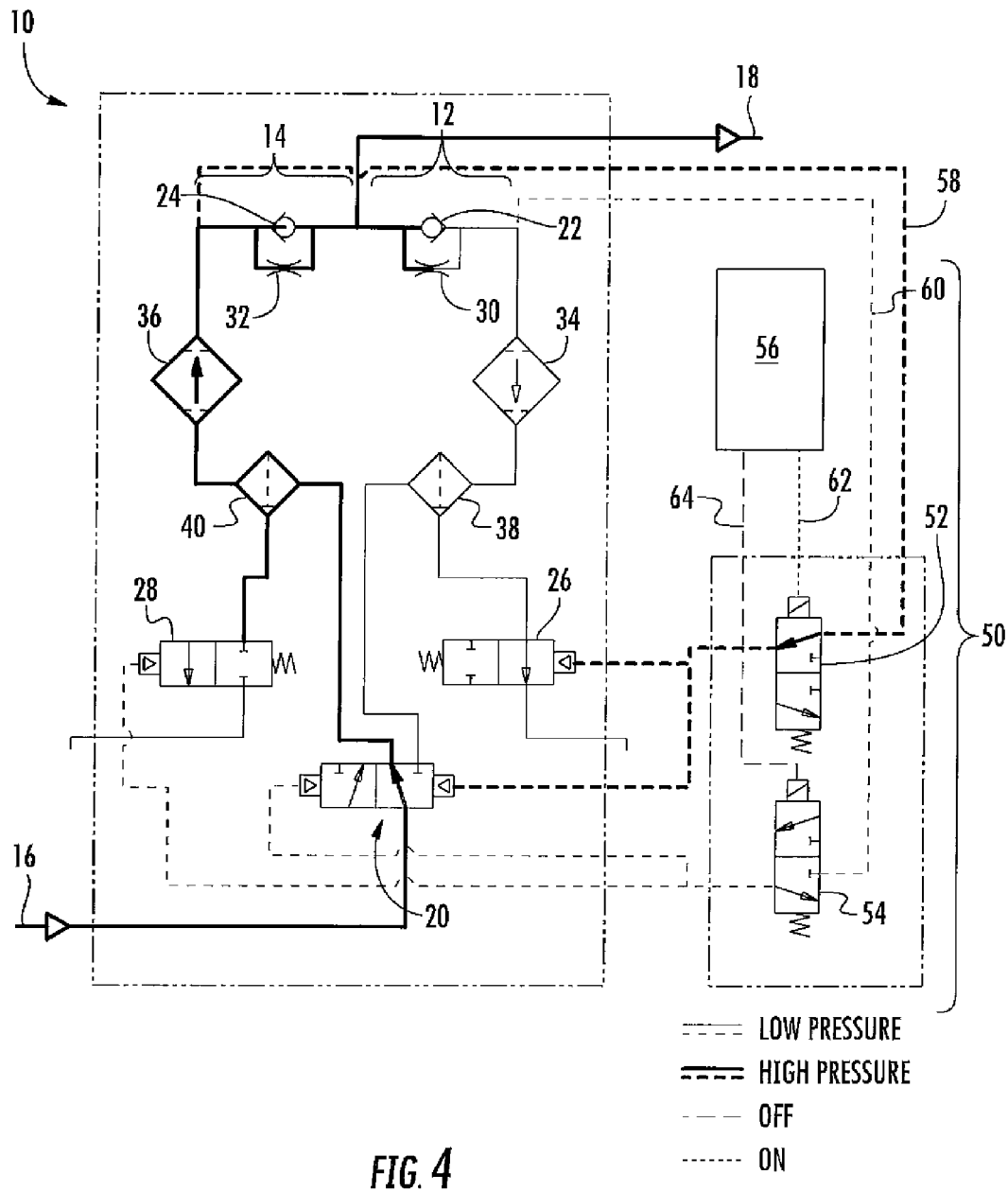
FIG. 4 is a schematic diagram of the air dryer shown in FIG. 1 during normal operation with the left flow path drying compressed air and the right flow path purging.

At the end of the first flow path 12 drying cycle, the controller 56 switches the air dryer 10 to the second flow path 14 drying cycle, as shown in FIG. 4. At the beginning of the second flow path 14 drying cycle, the controller 56 turns the first signal 62 on to actuate the solenoid on the first control air valve 52. As a result, the first control air valve 52 opens, and the first sensing line 58 communicates pressure from upstream of the second check valve 24, through the first control air valve 52, to the diverter valve 20 and the first exhaust valve 28. The control air moves the diverter valve 20 to the second position and opens the first exhaust valve 26. In the second position, the diverter valve 20 allows the compressed air to flow from the inlet 16, through the diverter valve 20, and into the second flow path 14. The second signal 64 is off during the entire second flow path 14 drying cycle, so the second control air valve 54 is shut, and the second exhaust valve 28 is shut. As a result, the compressed air flows through the second coalescing filter 40 and second desiccant chamber 36 to remove moisture and particulate from the compressed air. The removed moisture collects in the second coalescing filter 40. The cleaned and dried compressed air then flows through the second check valve 24 and second bypass orifice 32 and exits the air dryer 10 through the outlet 18.

The first check valve 22 prevents the cleaned and dried compressed air from entering the first flow path 12. However, the first bypass orifice 30 allows a portion of the cleaned and dried air to flow backwards through the first desiccant chamber 34 and first coalescing filter 38 to purge moisture from the first coalescing filter 38 through the open first exhaust valve 26.

Figure 5:
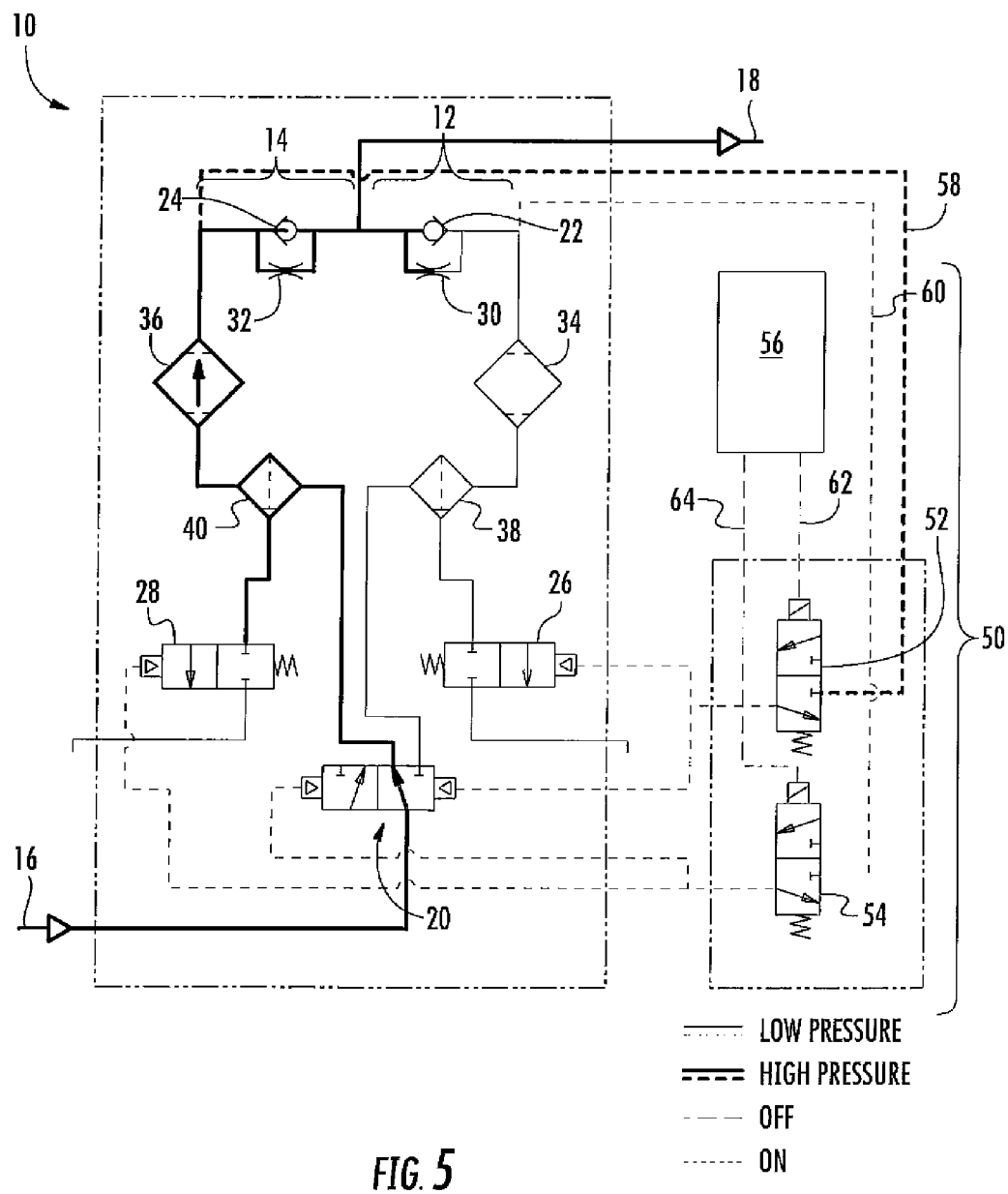
FIG. 5 is a schematic diagram of the air dryer shown in FIG. 1 during normal operation with the left flow path drying compressed air and the right flow path pressurizing.

FIG. 5 shows the second flow path 14 drying cycle after the controller 56 turns the first signal 62 off to allow the first flow path 12 to pressurize. When the first signal 62 is oft the first control air valve 52 shuts, removing control air pressure from the diverter valve 20 and the first exhaust valve 26. Without control air pressure, the diverter valve 20 remains in the second position, and the first exhaust valve 26 shuts. With the first exhaust valve 26 shut, the cleaned and dried compressed air flowing through the first bypass orifice 30 increases pressure in the first flow path 12 and in the second sensing line 60 that provides fluid communication to the second control air valve 54. The air dryer 10 is now ready to switch back to the first flow path 12 drying cycle, as shown in FIG. 2.

Figure 6:
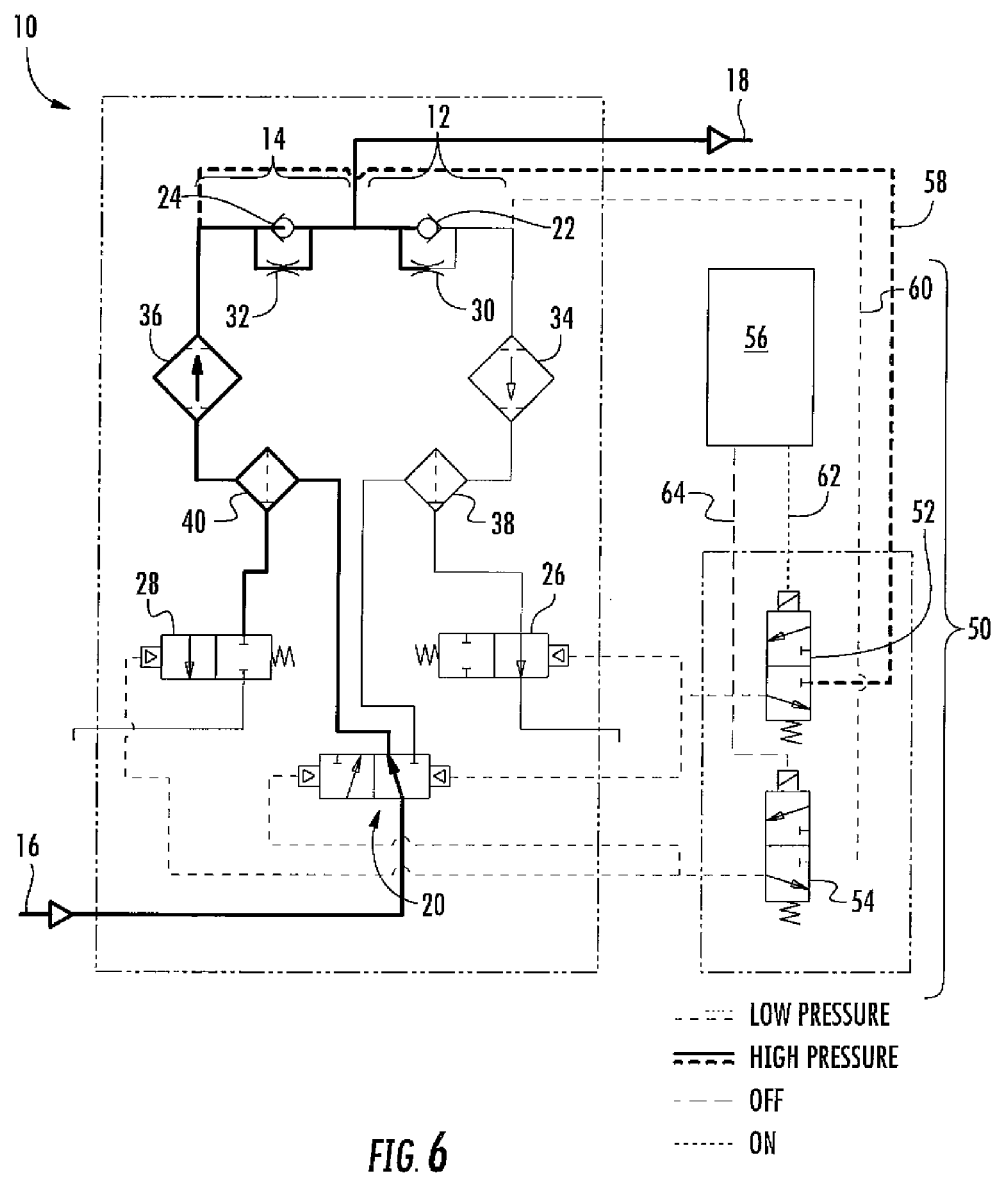
FIG. 6 is a schematic diagram of the air dryer shown in FIG. 5 during operation with the left flow path drying compressed air and the exhaust valve in the right flow path failed open.
Figure 7:
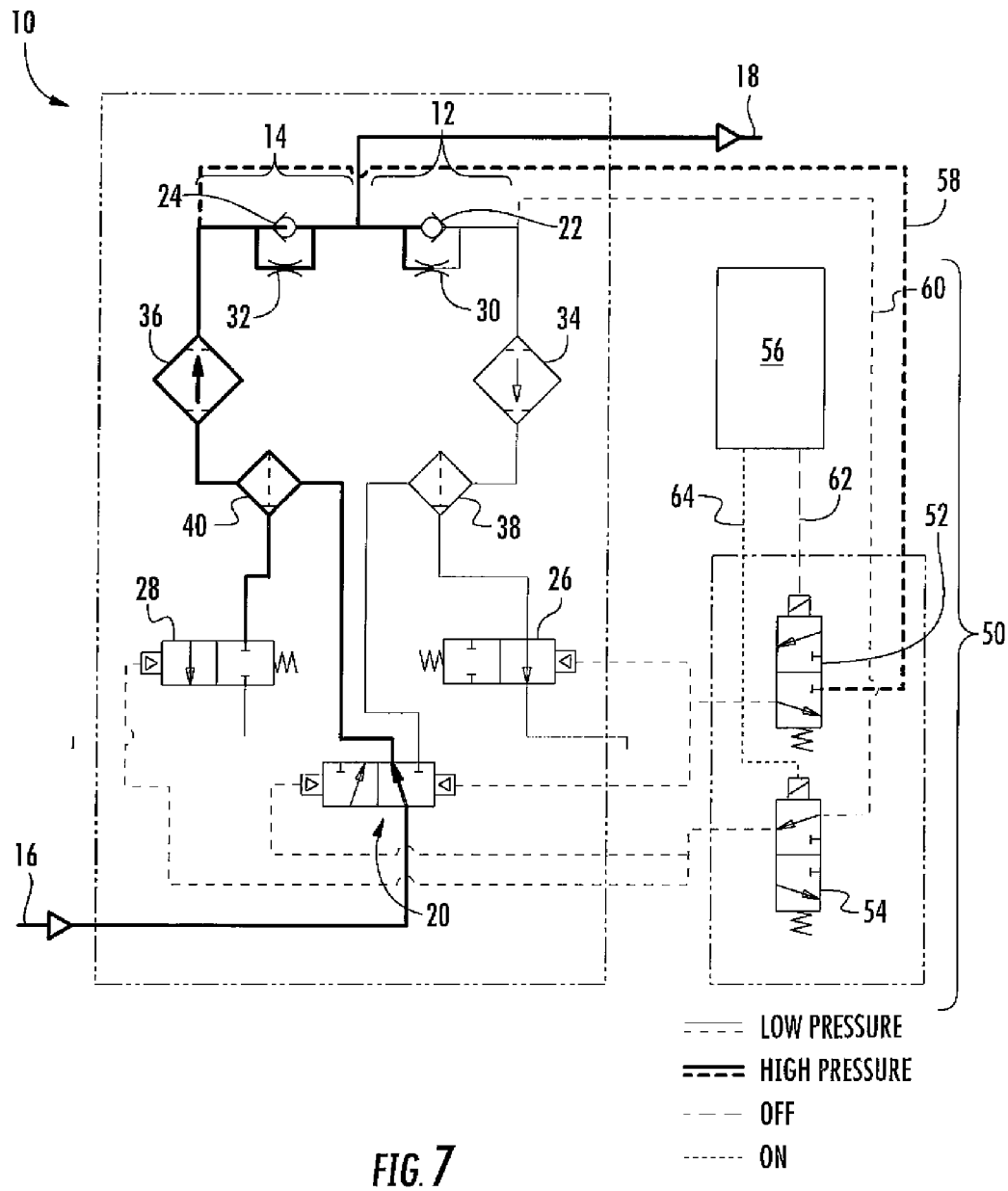
FIG. 7 is a schematic diagram of the air dryer shown in FIG. 5 during operation with the left flow path drying compressed air and the exhaust valve in the right flow path failed open without losing pressure in the compressed air.

FIGS. 6 and 7 provide schematic diagrams of how the air dryer 10 responds in the event one of the exhaust valves fails to shut. In this scenario, the air dryer 10 is in the second flow path 14 drying cycle and has just completed purging moisture from the first flow path 12, as previously described with respect to FIG. 4. As a result, the controller 56 turns the first signal 62 off to allow the first flow path 12 to pressurize, as previously described with respect to FIG. 5. With the first signal 62 off, the first control air valve 52 shuts, removing control air pressure from the diverter valve 20 and the first exhaust valve 26. Without control air pressure, the diverter valve 20 remains in the second position, and the first exhaust valve 26 should shut. In this particular scenario, however, the first exhaust valve 26 remains open, and the first flow path 12 continues purging compressed air through the first exhaust valve 26. As a result, pressure does not increase in the first flow path 12 or the second sensing line 60 that provides fluid communication to the second control air valve 54.

Referring the FIG. 7, when it is time to switch back to the first flow path 12 drying cycle, as previously described with respect to FIG. 2, the controller 56 turns the second signal 64 on to actuate the solenoid on the second control air valve 54. As a result, the second control air valve 54 opens to provide control air from upstream of the first check valve 22 to the diverter valve 20 and the second exhaust valve 28. With the first exhaust valve 26 failed open, however, the first flow path 12 and second sensing line 60 did not pressurize. As a result, the pressure of the control air is not sufficient to reposition either the diverter valve 20 or second exhaust valve 28, and the air dryer 10 remains in the second flow path 14 drying cycle with the second flow path 14 drying the air and the first flow path 12 purging through the first exhaust valve 26. Although the failed open first exhaust valve 26 results in a loss of some compressed air, the air dryer 10 remains in service to supply the downstream equipment with clean and dry compressed air.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An air dryer, comprising:

a. a first flow path through the air dryer, wherein the first flow path comprises a first check valve that prevents fluid flow into the first flow path and a first exhaust valve having an open position that permits fluid flow out of the first flow path and a shut position that prevents fluid flow out of the first flow path;

b. a second flow path in parallel with the first flow path, wherein the second flow path comprises a second check valve that prevents fluid flow into the second flow path and a second exhaust valve having an open position that permits fluid flow out of the second flow path and a shut position that prevents fluid flow out of the second flow path;

c. a first control air valve that provides fluid communication from upstream of the second check valve to the first exhaust valve; and d. a second control air valve that provides fluid communication from upstream of the first check valve to the second exhaust valve.

2. The air dryer as in claim 1, further comprising a diverter valve having a first position that provides fluid communication to the first flow path and a second position that provides fluid communication to the second flow path.

3. The air dryer as in claim 2, wherein the first control air valve provides fluid communication from upstream of the second check valve to the diverter valve.

4. The air dryer as in claim 2, wherein the second control valve provides fluid communication from upstream of the first check valve to the diverter valve.

5. The air dryer as in claim 1, further comprising means for removing moisture from the first and second flow paths.

6. The air dryer as in claim 1, further comprising means for removing moisture from the first and second flow paths, a first bypass orifice that provides fluid communication around the first check valve and a second bypass orifice that provides fluid communication around the second check valve.

7. The air dryer as in claim 1, further comprising means for removing moisture from the first and second flow paths, a first bypass orifice that provides fluid communication around the first check valve, a second bypass orifice that provides fluid communication around the second check valve, and a controller that positions the first and second control air valves.

8. An air dryer, comprising:
a. a first flow path through the air dryer, wherein the first flow path comprises a first check valve that prevents fluid flow into the first flow path and a first exhaust valve having an open position that permits fluid flow out of the first flow path and a shut position that prevents fluid flow out of the first flow path;

b. a second flow path in parallel with the first flow path, wherein the second flow path comprises a second check valve that prevents fluid flow into the second flow path and a second exhaust valve having an open position that permits fluid flow out of the second flow path and a shut position that prevents fluid flow out of the second flow path;

c. a diverter valve having a first position that provides fluid communication to the first flow path and a second position that provides fluid communication to the second flow path;

d. a first control air valve that provides fluid communication from upstream of the second check valve to the diverter valve; and e. a second control air valve that provides fluid communication from upstream of the first check valve to the diverter valve.

9. The air dryer as in claim 8, wherein the first control air valve provides fluid communication from upstream of the second check valve to the first exhaust valve.

10. The air dryer as in claim 8, wherein the second control valve provides fluid communication from upstream of the first check valve to the second exhaust valve.

11. The air dryer as in claim 8, further comprising means for removing moisture from the first and second flow paths.

12. The air dryer as in claim 8, further comprising means for removing moisture from the first and second flow paths, a first bypass orifice that provides fluid communication around the first check valve and a second bypass orifice that provides fluid communication around the second check valve.

13. The air dryer as in claim 8, further comprising means for removing moisture from the first and second flow paths, a first bypass orifice that provides fluid communication around the first check valve, a second bypass orifice that provides fluid communication around the second check valve, and a controller that positions the first and second control air valves.

14. An air dryer, comprising:
a. a first flow path through the air dryer, wherein the first flow path comprises a first check valve that prevents fluid flow into the first flow path and a first exhaust valve having an open position that permits fluid flow out of the first flow path and a shut position that prevents fluid flow out of the first flow path;

b. a second flow path in parallel with the first flow path, wherein the second flow path comprises a second check valve that prevents fluid flow into the second flow path and a second exhaust valve having an open position that permits fluid flow out of the second flow path and a shut position that prevents fluid flow out of the second flow path;

c. a diverter valve having a first position that provides fluid communication to the first flow path and a second position that provides fluid communication to the second flow path; and d. an interlock operably connected to the diverter valve and the first and second exhaust valves, wherein the interlock prevents positioning the diverter valve to the first position when the first exhaust valve is in the open position and prevents positioning the diverter valve to the second position when the second exhaust valve is in the open position.

15. The air dryer as in claim 14, wherein the interlock comprises a first control air valve that provides fluid communication from upstream of the second check valve to the diverter valve.

16. The air dryer as in claim 15, wherein the first control air valve provides fluid communication from upstream of the second check valve to the first exhaust valve.

17. The air dryer as in claim 14, wherein the interlock comprises a second control air valve that provides fluid communication from upstream of the first check valve to the diverter valve.

18. The air dryer as in claim 17, wherein the second control valve provides fluid communication from upstream of the first check valve to the second exhaust valve.

19. The air dryer as in claim 14, further comprising means for removing moisture from the first and second flow paths.

20. The air dryer as in claim 14, further comprising means for removing moisture from the first and second flow paths, a first bypass orifice that provides fluid communication around the first check valve and a second bypass orifice that provides fluid communication around the second check valve.

* * * * *